United States Patent [19]

Van Meter

[11] 4,158,366
[45] Jun. 19, 1979

[54] SILLCOCK WITH WATER RELIEF SYSTEM

[76] Inventor: Chester J. Van Meter, Rte. 2, Box 53, Sapulpa, Okla. 74066

[21] Appl. No.: 819,288

[22] Filed: Jul. 27, 1977

[51] Int. Cl.² .................... F16K 37/00; F16L 5/00
[52] U.S. Cl. .................... 137/312; 137/360; 137/375; 137/551
[58] Field of Search ............... 137/68 R, 59, 60, 62, 137/312, 375, 360, 551, 359; 138/27, 32; 73/40.5 R; 285/13, 14, 138

[56] References Cited

U.S. PATENT DOCUMENTS

| 239,284 | 3/1881 | Weisbarth | 137/357 X |
| 316,967 | 5/1885 | Heber | 137/375 X |
| 2,952,270 | 9/1960 | Fulton et al. | 137/360 |

FOREIGN PATENT DOCUMENTS 528418  6/1977  U.S.S.R. ................... 137/68 R

Primary Examiner—Martin P. Schwadron
Assistant Examiner—Richard Gerard

[57] ABSTRACT

The sillcock includes an inner tubular pipe forming a water-flow passage and an outer tubular pipe cooperating with the inner tubular pipe to form a water relief chamber. When the inner tubular pipe is ruptured as a result of the expansion of ice in the inter-flow passage, water from the source is directed across the open valve of the sillcock into the water-flow passage where it escapes into the water relief chamber through the ruptured opening. The relief chamber is opened to the atmosphere and water emerging therefrom alerts a person to the fact that the inner tubular pipe has ruptured thereby requiring repair or replacement.

5 Claims, 2 Drawing Figures

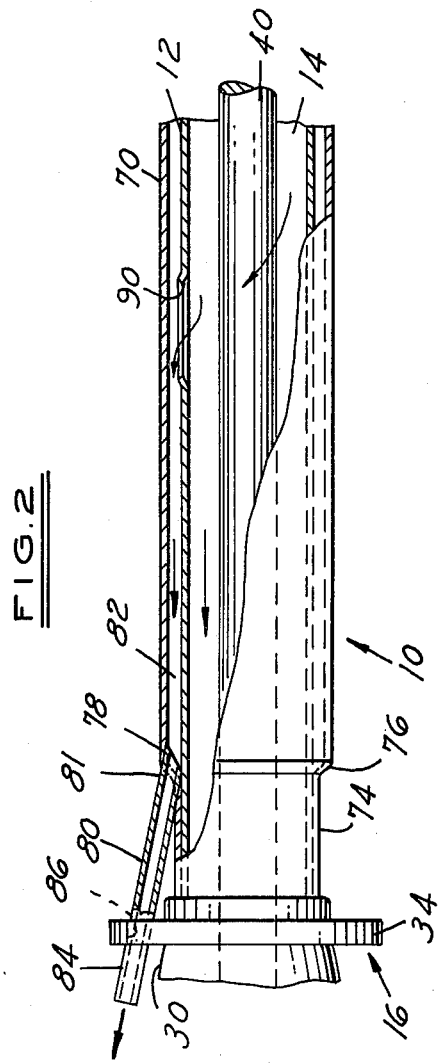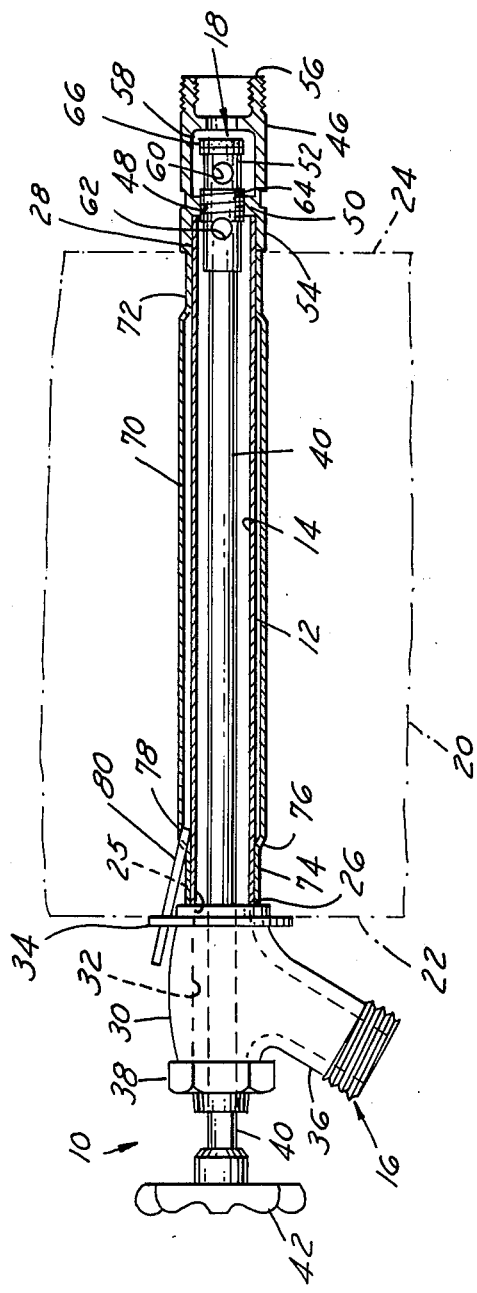

1

SILLCOCK WITH WATER RELIEF SYSTEM

BACKGROUND OF THE PRESENT INVENTION

1. Field of the Invention

The present invention pertains broadly to improvements in sillcocks or faucets for use in geographical areas where the temperature approaches freezing during certain periods of the year.

2. Description of the Prior Art

A preliminary novelty search in the U.S. Patent and Trademark Office resulted in the following U.S. Pat. Nos. Orwig, 448,727, Mar. 24, 1891; Minor et al, 560,519, May 19, 1896; Troy, 585,061, June 22, 1897; Orser, 1,054,024, Feb. 25, 1913; Jonsson, 1,473,562, Nov. 6, 1923; Sampson, 1,517,384, Dec. 2, 1924; Smith, 1,878,002, Sept. 20, 1932; Managhan, 2,995,140, Aug. 8, 1961; Fulton et al, 3,407,837, Oct. 29, 1968; Branitzky, 3,552,411, Jan. 5, 1971; Yoon, 3,913,602, Oct. 21, 1975; and Katzman, 3,926,051, Dec. 16, 1975. While these patents teach various prior art methods and valve structures for dealing with freezing conditions, none of them illustrates the use of an outer tubular pipe cooperating with an inner tubular pipe and forming a water relief flow chamber or zone therebetween which is vented to atmosphere for discharging water escaping through a ruptured opening in the wall of the inner tubular pipe caused by ice formed in the inner pipe.

SUMMARY OF THE PRESENT INVENTION

It is a feature of the present invention to provide a frostproof sillcock comprising an inner elongated tubular pipe having a water-flow passage therein and adapted to extend through a building wall, a spout and a water regulating handle means assembly connected to the outer end of the inner tubular pipe and having a water-flow passage communicating with the water-flow passage in the inner tubular pipe, a valve means assembly connected to the inner end of the inner tubular pipe, an elongated valve stem within the inner tubular pipe and in coaxial alignment therewith, the valve stem having one end thereof secured to the valve of the valve means assembly and the other end connected to the handle of the regulating handle means assembly, and an outer elongated tubular pipe concentric with the inner tubular pipe and spaced therefrom throughout substantially the entire length thereof, with the inner and outer tubular pipes forming a relief flow chamber for water escaping through an opening in the wall of the inner tubular pipe upon the rupture thereof, and with the relief flow chamber being opened to the atmosphere to permit the water to be discharged therefrom.

A further feature of the present invention is to provide a frostproof sillcock of the aforementioned type wherein the relief flow chamber is parallel to the water-flow passage in the inner tubular pipe.

A still further feature of the present invention is to provide a frostproof sillcock of the aforementioned type wherein the end portions of the outer tubular pipe are sleeved over and in contact with the inner tubular pipe.

Another feature of the present invention is to provide a frostproof sillcock of the aforementioned type wherein the outer tubular pipe is provided with an aperture and a tubular discharge element has one end portion extending through the aperture into fluid communication with the relief flow chamber, with the discharge element being opened to atmosphere and discharging the water from the relief flow chamber.

Still another feature of the present invention is to provide a frostproof sillcock of the aforementioned type wherein the other end portion of the discharge element is located adjacent the spout.

A further feature is to provide a frostproof sillcock of the aforementioned type wherein the spout has a flange provided with an opening, with the other end portion of the discharge element extending through the flange opening for positioning same relative to the spout.

A still further feature is to provide a sillcock that utilizes a water relief system to vent the water from the main water-flow passage once the inner tubular element has ruptured as a result of the expansion of ice formed therein.

Another feature of the present invention is to provide a sillcock that is economical to manufacture, is designed for use in all geographical areas where freezing may occur, is easy to repair and maintain, is efficient in operation and is attractive in appearance.

BRIEF DESCRIPTION OF THE DRAWINGS

FIG. 1 is a front elevational view of the sillcock, partly in section, with the valve therein in an opened position; and FIG. 2 is a fragmentary view of the sillcock, with parts broken away and in section, illustrating a ruptured opening in the inner tubular pipe and the flow of water through the open valve and ruptured opening into the water relief system.

DESCRIPTION OF A PREFERRED EMBODIMENT

Referring now to the drawing, the frostproof sillcock or faucet 10 has an inner elongated tubular pipe or body portion 12 having an elongated water-flow passage 14 therein, a conventional spout and water regulating handle assembly 16 which is connected to the outer end of the inner tubular pipe 12 and a conventional valve assembly 18 which is connected to the inner end of the inner tubular pipe 12.

The sillcock 10 forms a wall hydrant which is placed or extends through a building wall 20, with the spout and water-regulating handle assembly 16 located adjacent the outside surface 22 of wall 20 and with the valve assembly 18 located adjacent the inside surface 24 of wall 20. The sillcock 10 is mounted in wall 20 at a slight downward angle, not shown, from the inside wall 24 to the outside wall 22.

Referring now to FIG. 1, the inner tubular pipe 12 extends through the building wall 20. The length of inner pipe 12 is determined by the thickness of the building wall 20 through which it passes and such additional length as to permit the connection of the spout and water regulating handle assembly 16 at the outer end of pipe 12 and the connection of the valve assembly 18 at the inner end 28 of pipe 12 as is well known in the art.

The spout and water regulating handle assembly 16 comprises a spout or spout body 30 having a water-flow passage 32 therein communicating with the water-flow passage 14 of the inner tubular pipe 12. The spout body 30 has a conventional flanged aperture 25 to receive the outer end 26 of the inner tubular pipe 12, a spout pipe 36 communicating with the water-flow passage 32, a second aperture therein located opposite the flanged aperture 25 and in axial alignment therewith and adapted to receive a handle nut cap 38. The cap 38 has an aperture therein in axial alignment with the inner tubular pipe 12 to receive an elongated rod or valve stem 40 to which a handle 42 is connected. A seal, not shown, is provided between the nut cap 38 and spout body 30.

The valve assembly 18 comprises an outer tubular casing 46 having internal threads 48 adjacent an intermediate section 50 and a water regulating threaded stem connector 52 adapted to receive the threads 48. The end section 54 of the casing 46 is adapted to receive the inner end 28 of the inner tubular pipe 12 and the other end section 56 of the casing 46 is adapted to receive a water supply pipe (not shown) as is conventional in the art. The outer tubular casing 46 has an entry port or seat 58. The water regulating threaded stem connected 52 is secured to valve stem 40 and has an entrance port 60 and a discharge port 62 on opposite sides of the threaded section 48. The ports 60 and 62 are connected by a passage 64.

The valve assembly 18 further includes a resilient bibb washer or valve element 66, as an example made from rubber, which is secured to the end face of the threaded stem connector 52. The valve element 66 is movable towards or away from valve seat 58 to control flow across the seat 58. Thus the sillcock 10 is designed to shut off the water at the butt of the sillcock when valve element 66 seats against valve seat 58 as a result of the rotation of handle 42, valve stem 40 and the threaded stem connector 52 which carried valve element 66. During non-freezing weather, when the valve element 66 is closed, the water remaining in the water-flow passage 14 escapes to the ground as a result of the downward inclination of the sillcock 10.

When a hose, not shown, is secured to the spout pipe 36 during freezing weather, a vacuum results in the sillcock 10 which holds or maintains the water in the water-flow passage 14. As a result of the freezing condition, the water in passage 14 freezes and the ice formed ruptures the inner tube or pipe 12.

It is well known that when water freezes it expands approximately one-eleventh of its volume and the force produced thereby is greater than the tensile strength of the materials used in constructing the inner tubular pipe 12. Breakage or rupture of the tubular pipe 12 results. When the home owner turns on the sillcock 10 to use the water after the rupture occurs, the water floods the inside of the house, since the water is inside of the wall 20 and cannot be seen. Thus severe flooding usually results.

In order to alert the home owner of the rupture of the inner tube 12, a water relief system is provided which provides a positive indication of the ruptured tube 12. An outer elongated tubular pipe 70 is provided which is concentric with and spaced from inner pipe 12 throughout substantially the entire length thereof except at the inner and outer end portions 72 and 74. The end portions 72 and 74 are reduced in diameter and are sleeved over and in supporting contact with the inner pipe 12 as shown in FIG. 1.

The outer pipe 70 includes a tapered wall portion 76 between the main portion of pipe 70 and the outer reduced portion 74. A small hole 78 is provided in wall portion 76 adjacent the outer end portion of the outer pipe 70. An elongated water discharge relief stem, tube or element 80 has one end portion 81 inserted into hole 78 and is in fluid communication with the water relief chamber 82 formed between the concentric inner and outer pipes 12 and 70. The discharge tube 80, as an example, is secured to tube 70 by welding or by other appropriate means.

The other end portion 84 of discharge tube 80 extends through an opening 86 provided in the spout flange 36. Thus the flange 36 supports and positions the discharge tube 80. The end portion 84 of tube 80 overlies and terminates above the spout 30 as shown in the drawing.

FIG. 2 illustrates the inner tubular pipe 12 with a ruptured opening 90 in the wall thereof resulting from the ice. When the owner turns on the sillcock 10 and moves valve element 66 away from the seat 58, the water from the source flows through port 60, passage 64 and port 62 into the water-flow passage 14 where it escapes through the ruptured opening 90 into the water relief area or chamber 82 and from where the water emerges to the atmosphere at the outside of building 20 through discharge tube 80.

When the home owner operates the handle 42 and the attached valve structure to open the sillcock after the fracture has occurred in inner pipe 12, the water will be discharged through the ruptured opening 90, chamber 82 and discharge tube 84 and will fall on the hands of the operator since the tube 84 overlies the spout 30. This provides a positive and visual indication to the owner or operator indicating that a fracture or rupture has occurred in pipe 12 and that the sillcock requires repair or replacement. At this point, the owner or operator closes the sillcock 10 by seating valve element 66 against seat 58. As a result of this procedure there will be no flooding or serious water damage to the interior of the building structure.

What is claimed is:

1. A frostproof sillcock comprising an inner elongated tubular pipe having a water-flow passage therein and adapted to extend through a building wall, a spout and a water regulating handle means assembly connected to the outer end of said inner tubular pipe and having a water-flow passage communicating with the water-flow passage in said inner tubular pipe, a valve means assembly connected to the inner end of said inner tubular pipe, an elongated valve stem within said inner tubular pipe and in coaxial alignment therewith, said valve stem having one end thereof secured to the valve of said valve means assembly and the other end connected to the handle of said regulating handle means assembly, and an outer elongated tubular pipe concentric with said inner tubular pipe and spaced therefrom throughout substantially the entire length thereof, said inner and outer tubular pipes forming a water relief flow chamber for water escaping through an opening in the wall of said inner tubular pipe upon the rupture thereof, said relief flow chamber being provided with a discharge element which is opened to the atmosphere to permit the water to be discharged from said relief flow chamber, said discharge element having one end portion extending through and being carried by said outer elongated tubular pipe and the other end thereof terminating adjacent said handle means.

2. The frostproof sillcock defined in claim 1, wherein the other end portion of said discharge element is located adjacent to and is carried by said spout.

3. A frostproof sillcock comprising an inner elongated tubular pipe having a water-flow passage therein and adapted to extend through a building wall, a spout and a water regulating handle means assembly connected to the outer end of said inner tubular pipe and having a water-flow passage communicating with the water-flow passage in said inner tubular pipe, a valve means assembly connected to the inner end of said inner tubular pipe, an elongated valve stem within said inner tubular pipe and in coaxial alignment therewith, said valve stem having one end thereof secured to the valve of said valve means assembly and the other end connected to the handle of said regulating handle means assembly, an outer elongated tubular pipe concentric with said inner tubular pipe and spaced therefrom throughout substantially the entire length thereof, said inner and outer tubular pipes forming a water relief flow chamber for water escaping through an opening in the wall of said inner tubular pipe upon the rupture thereof, said relief flow chamber being opened to the atmosphere to permit the water to be discharged from said relief flow chamber, said outer tubular pipe being provided with an aperture, a tubular discharge element having one end portion extending through said aperture into fluid communication with said relief flow chamber, said discharge element being opened to atmosphere and discharging the water from said relief flow chamber, the other end portion of said discharge element being located adjacent said spout, said spout having a flange provided with an opening, said other end portion of said discharge element extending through said flange opening for positioning same relative to said spout.

4. The frostproof sillcock defined in claim 3 wherein said relief flow chamber is parallel to said water-flow passage in said inner tubular pipe.

5. The frostproof sillcock defined in claim 4 wherein the end portions of said outer tubular pipe are sleeved over and in contact with said inner tubular pipe.